United States Patent [19]

Matsuno et al.

[11] Patent Number: 5,351,902
[45] Date of Patent: Oct. 4, 1994

[54] 8MM VIDEO TAPE CASSETTE

[75] Inventors: Kouji Matsuno, Miyotamachi; Kiyotaka Okuyama, Usudamachi, both of Japan

[73] Assignee: TDK Corporation, Tokyo, Japan

[21] Appl. No.: 890,918

[22] Filed: May 29, 1992

[30] Foreign Application Priority Data

May 31, 1991 [JP]  Japan ................. 3-049131[U]

[51] Int. Cl.$^5$ ............................................. B65H 75/18
[52] U.S. Cl. ................................. 242/345; 242/347.1
[58] Field of Search ................. 242/199, 200, 71.8

[56] References Cited

U.S. PATENT DOCUMENTS

| | | | |
|---|---|---|---|
| 4,418,373 | 11/1983 | Fujimori et al. | 242/199 X |
| 4,515,331 | 5/1985 | Stümpfi et al. | 242/199 |
| 4,634,020 | 1/1987 | Beyersbergen | 242/199 X |
| 4,995,565 | 2/1991 | Urayama et al. | 242/199 X |
| 5,082,197 | 1/1992 | Satoh | 242/199 |
| 5,092,537 | 3/1992 | Eggebeen | 242/199 |
| 5,107,386 | 4/1992 | Hashizume et al. | 242/199 X |

FOREIGN PATENT DOCUMENTS

50-137017  11/1975  Japan.

*Primary Examiner*—Daniel P. Stodola
*Assistant Examiner*—Eileen A. Dunn
*Attorney, Agent, or Firm*—Price, Gess & Ubell

[57] ABSTRACT

An 8 mm video tape cassette capable of rendering back-tension of a tape optimum to minimize damage to a tape edge and and clogging of a head. A hub of a feed reel on which a magnetic tape of 11.0 μm or less in thickness is wound is formed with a diameter of 25 mm or more and preferably 25 to 31 mm.

5 Claims, 3 Drawing Sheets

8MM VIDEO TAPE CASSETTE

BACKGROUND OF THE INVENTION

1. Field of the Invention

This invention relates to an 8 mm vide tape cassette.

2. Description of Related Art

In general, a conventional 8 mm video tape cassette is so constructed that a magnetic tape is arranged in a cassette casing while being wound on hubs of feed and take-up reels each formed with a diameter of about 16 mm. A magnetic tape for the 8 mm video tape cassette is generally classified into two kinds based on its thickness. More particularly, it includes a 13 μm type magnetic tape (thickness: 13.0 ±1.0 μm) and a 10 μm one (10.0 ±0.8 μm). When recording time is set to be 60 minutes or less, the 13 μm type magnetic tape is typically used because it permits the hub of each of the reels to take up the tape with a sufficient space and exhibits sufficient strength.

When a magnetic tape of a smaller thickness is substituted for the 13 μm type magnetic tape in the 8 mm video tape cassette, the cassette is deteriorated in durability and reliability because the magnetic tape is decreased in stiffness and can be damaged at an edge thereof.

SUMMARY OF THE INVENTION

The present invention has been made in view of the foregoing disadvantage of the prior art.

Accordingly, it is an object of the present invention to provide an 8 mm video tape cassette which is capable of accommodating itself to a tape of a thickness as small as 11 μm or less.

It is another object of the present invention to provide an 8 mm video tape cassette which is capable of exhibiting satisfactory durability and reliability.

It is a further object of the present invention to provide an 8 mm video tape cassette which is capable of being simplified in construction and decreased in manufacturing cost.

In accordance with the present invention, an 8 mm video tape cassette is provided. The 8 mm video tape cassette includes a casing, a feed reel and a take-up reel each including a hub and rotatably arranged in the casing, and a magnetic tape formed with a thickness of 11.0 μm or less and wound on the feed reel and take-up reel so as to extend therebetween. The casing is provided with an opening through which the magnetic tape is drawn out from the casing. The cassette also includes an openable lid pivotally mounted on the casing so as to cover the opening of the casing. The hub of the feed reel is formed with a diameter of 25 mm or more.

In a preferred embodiment of the present invention, the hub of the feed reel is formed with a diameter of 25 to 31 mm.

In a preferred embodiment of the present invention, the hub of the take-up reel is formed With a diameter of 25 to 31 mm.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, an 8 mm video tape cassette according to the present invention will be described with reference to the accompanying drawings.

Figure 1:
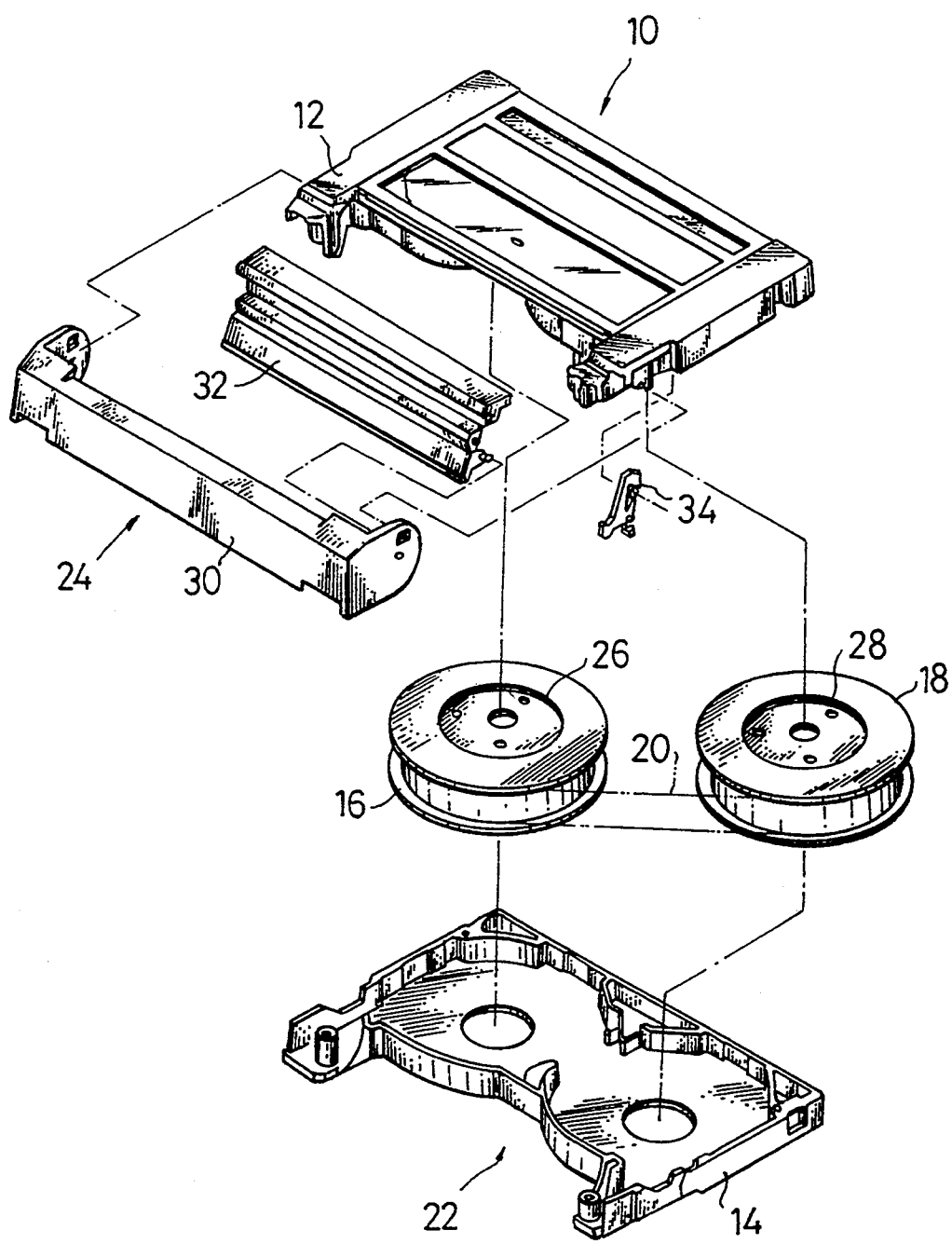
FIG. 1 is an exploded perspective view showing an embodiment of an 8 mm video tape cassette according to the present invention.
Figure 2:
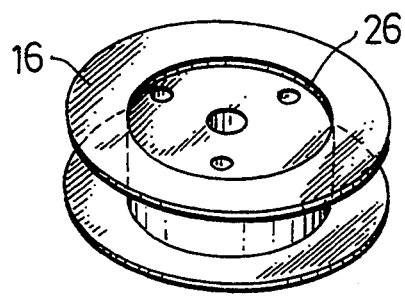
FIG. 2 is an enlarged perspective view showing a reel in the 8 mm video tape cassette of FIG. 1.

Referring first to FIGS. 1 and 2 showing an embodiment of an 8 mm video tape cassette according to the present invention, an 8 mm video tape cassette of the illustrated embodiment includes a casing 10 including an upper casing member 12 and a lower casing member 14, in which a pair of reels or a feed reel 16 and a take-up reel 18 are rotatably arranged. On the feed and take-up reels 16 and 18 is wound a magnetic tape 20 having a thickness of 11.0 μm or less, for example, 10 μm so as to extend therebetween. The casing 10 is formed at a front portion thereof with an opening 22 through which a part of the magnetic tape 20 is drawn out from the casing or exposed. The opening 22 is covered with an openable lid 24 pivotally mounted at the front portion of the casing 10.

The 8 mm video tape cassette of the illustrated embodiment which is generally constructed as described above is featured in that the feed reel 16 includes a hub 26 formed with a diameter of 25 mm or more and preferably 25 to 31 mm.

The take-up reel 18 likewise includes a hub 28, which is preferably formed with a diameter of 25 to 31 mm. Thus, the illustrated embodiment is so constructed that the hubs 26 and 28 of the feed reel 16 and take-up reel 18 on which the tape 20 of 11.0 μm or less in thickness is wound, each are formed with a diameter of 25 to 31 mm.

Figure 3:
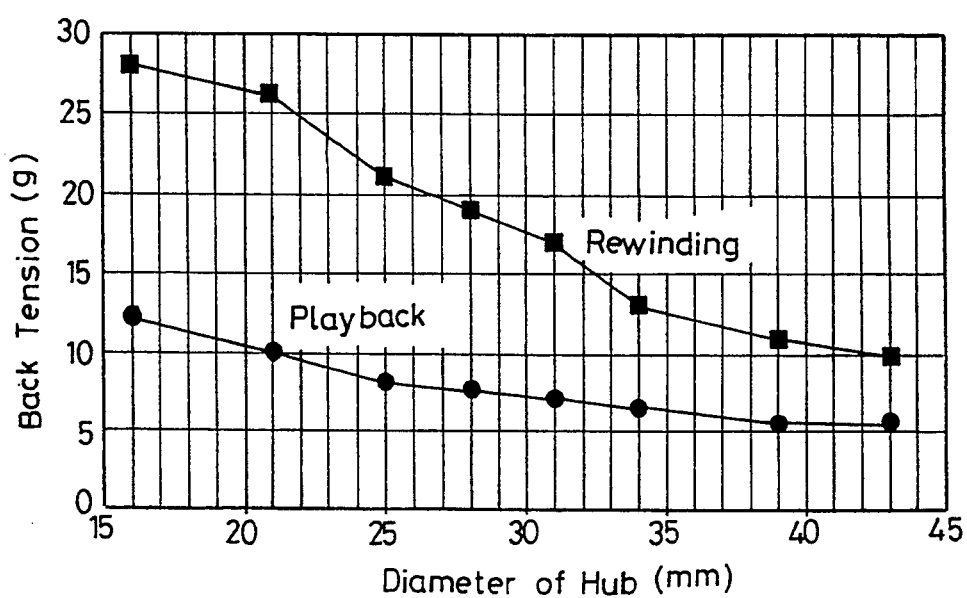
FIG. 3 is a graphical representation showing the relationship between a winding diameter of a reel and back-tension of a tape when the tape travels in each of playback and rewinding modes of a VTR.

The relationship between the diameter of the hub and back-tension of the tape measured when the 8 mm video tape cassette was operated in an 8 mm VTR to permit the tape 20 to travel therein was as shown in Table 1 and FIG. 3.

TABLE 1

Results of Measurement of Back-Tension in Traveling of Tape in VTR

| Diameter of Hub of Feed Reel (mm) | Back-Tension (g) | | |
|---|---|---|---|
| | Playback | Fast Forward | Rewind |
| 43 | 5.5 | 8 | 10 |
| 39 | 5.5 | 8 | 11 |
| 34 | 6.5 | 9 | 13 |
| 31 | 7 | 9–10 | 17 |
| 28 | 7.5 | 9–10 | 19 |
| 25 | 8 | 10–11 | 21 |
| 21 | 9–10 | 10–12 | 24–26 |

TABLE 1-continued

Results of Measurement of Back-Tension in Traveling of Tape in VTR

| Diameter of Hub | Back-Tension (g) | | |
|---|---|---|---|
| of Feed Reel (mm) | Playback | Fast Forward | Rewind |
| 16 | 10–12 | 11–13 | 26–28 |

Thickness of Tape: 10 μm
Length of Tape: About 5 m
A VTR used for Measurement: Typical VTR including M loading travel system.

As will be noted from Table 1 and FIG. 3, when the hub 26 of the feed reel 16 has a diameter of 16 mm or more and below 26 mm, the back-tension is increased; whereas the diameter of 28 mm or more and below 31 mm permits the back-tension to be optimum. Also, the diameter of 31 mm or more causes the back-tension to be excessively reduced, leading to clogging of a head.

The measurement shown in Table 1 was made using a VTR wherein tension control is carried out under back-tension control. In this connection, the 8 mm video tape cassette of the illustrated embodiment including the feed reel hub having a diameter between 25 mm and 31 mm is likewise optimumly applied to a VTR from which the back-tension control is eliminated for the purpose of reducing the manufacturing cost.

Figure 4:
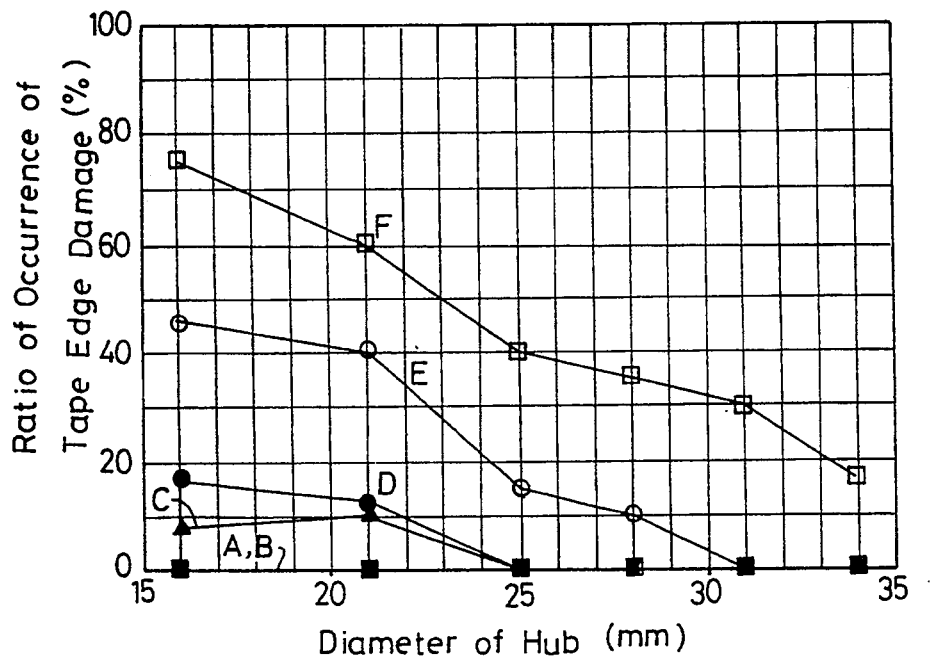
FIG. 4 is a graphical representation showing the relationship between a diameter of a hub and damage to a tape edge.

In addition, six kinds of magnetic tapes varied in thickness within a range from 7.5 to 13.0 mm as shown in Table 2 were evaluated on the relationship between a diameter of the hub of the feed reel and occurrence of tape edge damage. The results were as shown in FIG. 4 and Table 3.

TABLE 2

| Thickness of Test Tape | |
|---|---|
| Sample of Tape | Thickness of Tape (μm) |
| A | 13.0 |
| B | 11.5 |
| C | 11.0 |
| D | 10.0 |
| E | 8.3 |
| F | 7.5 |

TABLE 3

Relationship between Hub Diameter and Tape Edge Damage

| | Ratio of Occurrence of Tape Edge Damage (%) | | | | | |
|---|---|---|---|---|---|---|
| | Diameter of Hub | | | | | |
| Sample | 16 mm | 21 mm | 25 mm | 28 mm | 31 mm | 34 mm |
| A | 0 | 0 | 0 | 0 | 0 | 0 |
| B | 0 | 0 | 0 | 0 | 0 | 0 |
| C | 8 | 10 | 0 | 0 | 0 | 0 |
| D | 16 | 13 | 0 | 0 | 0 | 0 |
| E | 45 | 40 | 15 | 10 | 0 | 0 |
| F | 75 | 60 | 40 | 35 | 30 | 17 |

Figure 5:
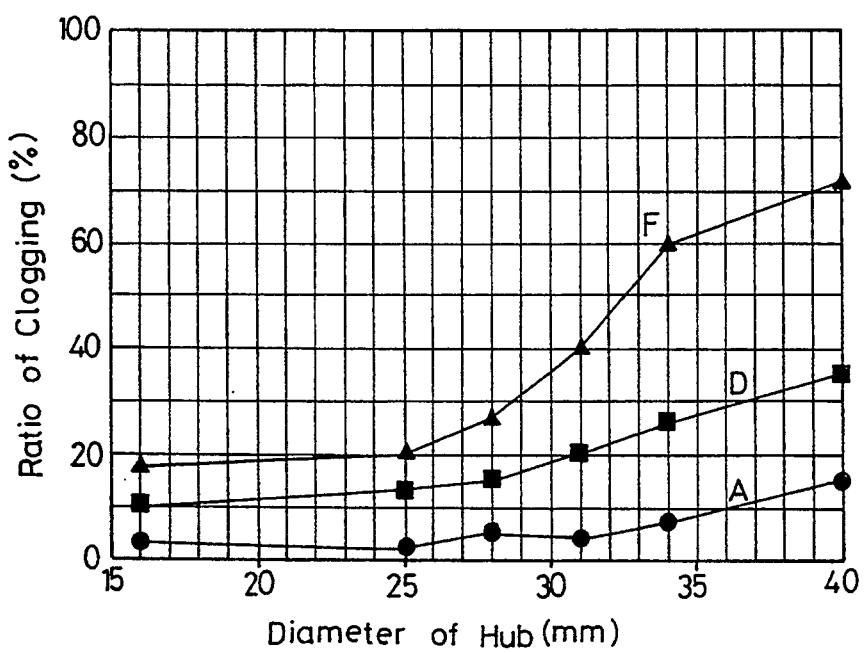
FIG. 5 is a graphical representation showing the relationship between a diameter of a hub and occurrence of clogging of a head.

The relationship between a diameter of the hub and occurrence of clogging of a hub was as shown in FIG. 5 and Table 4.

TABLE 4

Relationship between Hub Diameter and Clogging

| | Ratio of Occurrence of Clogging (%) | | | | | |
|---|---|---|---|---|---|---|
| | Diameter of Hub | | | | | |
| Sample | 16 mm | 21 mm | 25 mm | 28 mm | 31 mm | 34 mm |
| A | 3 | 2 | 5 | 4 | 7 | 15 |
| D | 10 | 13 | 15 | 20 | 26 | 35 |
| F | 18 | 20 | 27 | 40 | 60 | 72 |

As can be seen from the foregoing, the tape cassette using the hub of a diameter below 25 mm causes a ratio of occurrence of tape edge damage to be increased, whereas use of the hub of a diameter above 31 mm causes a ratio of occurrence of clogging of a head to be increased. This would indicate that use of a hub having a diameter below 25 mm or above 31 mm causes back-tension of the tape to be reduced, resulting in sweeping-off of foreign substances attached to a head such as dust or the like being deteriorated.

Thus, the construction of the illustrated embodiment wherein the hub is formed with a diameter of 25 to 31 mm significantly reduces the occurrence of tape edge damage and clogging. Such an advantage is remarkably exhibited on a tape of a decreased thickness.

Further, such an increase in diameter of the hub as described above in the illustrated embodiment significantly reduces a difference in back-tension between the initiation of winding of the tape and the termination of winding of the tape, to thereby ensure stable traveling of the tape.

The relationship between a thickness of the magnetic tape and occurrence of tape edge damage is summarized as shown in Table 3.

As described above, the casing 10 of the tape cassette is constituted by the upper casing member 12 and lower casing member 14 which are joined by screws and the magnetic tape 20 is rotatably received in the casing 10. Also, in the casing 10 are arranged partitions which define a passage along which the magnetic tape 20 travels and define the opening 22 at the front portion of the casing through which a part of the magnetic tape is exposed. The thus-exposed portion of the magnetic tape is covered by the openable lid 24. More particularly, the openable lid 24 includes a front lid member 30 for covering a front surface of the tape and a rear lid member 32 for covering a rear surface of the tape, which are rotatably mounted on the casing 10 so as to prevent dust or the like from entering the casing 10. Also, the openable lid 24 includes a locking member 34 mounted on the casing 10, which functions to constantly force the front lid member 30 in a direction of closing the member 30, so that the front lid member 30 is kept locked when it is closed and released when it is rendered open.

As can be seen from the foregoing, the present invention is so constructed that the hub of the feed reel on which a magnetic tape of 11.0 μm or less in thickness is wound is formed with a diameter of 25 mm or more and preferably 25 to 31 mm. Such construction permits the magnetic tape to exhibit optimum back-tension during the traveling, to thereby prevent clogging of a head and reduce damage to the tape edge even under hard service conditions, resulting in the video tape cassette being improved in durability and reliability. Such an advantage is likewise exhibited on a magnetic tape of a smaller thickness such as 10 μm or less.

While a preferred embodiment of the present invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An 8 mm video tape cassette comprising:
   a casing;
   a feed reel and a take-up reel each including a hub and rotatably arranged in said casing;

a magnetic tape formed with a thickness of 11.0 μm or less and wound on said feed reel and take-up reel so as to extend therebetween;

said casing being provided with an opening through which said magnetic tape is drawn out from said casing; and an openable lid pivotally mounted on said casing so as to cover said opening of said casing;

said hub of said feed reel being formed with a diameter of 25 mm or more.

2. An 8 mm video tape cassette as defined in claim 1, wherein said hub of said feed reel is formed with a diameter of 25 to 31 mm.

3. An 8 mm video tape cassette as defined in claim 1, wherein said hub of said take-up reel is formed with a diameter of 25 to 31 mm.

4. In an 8 mm video tape cassette having a casing provided with an opening through which video tape may be accessed and a movable lid member for permitting access to the opening, the improvement comprising:

a feed reel having a hub with a diameter between 25 to 31 mm, mounted in the casing;

a take-up reel having a hub with a diameter between 25 to 31 mm, mounted in the casing, and a magnetic tape with a thickness of 11.0 μm or less wound on the respective feed and take-up reel hubs.

5. An improved video tape cassette for an 8 mm wide video tape that can interface with a read-write recording head comprising:

a casing having an opening through which the video tape may be accessed;

a movable lid member for permitting access to the video tape through the casing opening;

a magnetic tape with a thickness of 11.0 μm or less; and means for reducing tape edge damage and controlling back tension of the video tape across the recording head including a feed reel having a hub with a diameter between 25 to 31 mm mounted in the casing and connected to the video tape and a take-up reel having a hub with a diameter between 25 and 31 mm mounted in the casing and connected to the video tape.

* * * * *